United States Patent
Wang et al.

(10) Patent No.: US 9,323,065 B2
(45) Date of Patent: Apr. 26, 2016

(54) OPTICAL MULTIPLEXER AND DEMULTIPLEXER AND A METHOD FOR FABRICATING AND ASSEMBLING THE MULTIPLEXER/DEMULTIPLEXER

(71) Applicant: Avago Technologies General IP (Singapore) Pte. Ltd., Singapore (SG)

(72) Inventors: Tak Kui Wang, Cupertino, CA (US); Ye Chen, San Jose, CA (US); Frank Yashar, Cupertino, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 159 days.

(21) Appl. No.: 14/068,827

(22) Filed: Oct. 31, 2013

(65) Prior Publication Data
US 2015/0116838 A1      Apr. 30, 2015

(51) Int. Cl.
| | | |
|---|---|---|
| G02B 27/14 | (2006.01) | |
| G02B 27/10 | (2006.01) | |
| H04J 14/02 | (2006.01) | |
| G02F 1/11 | (2006.01) | |
| F21V 8/00 | (2006.01) | |
| G02B 27/30 | (2006.01) | |
| G02B 1/11 | (2015.01) | |

(52) U.S. Cl.
CPC .......... G02B 27/142 (2013.01); G02B 27/1006 (2013.01); H04J 14/02 (2013.01); G02B 1/11 (2013.01); G02B 6/0001 (2013.01); G02B 27/30 (2013.01); G02F 1/11 (2013.01)

(58) Field of Classification Search
CPC ....... G02F 1/011; G02F 1/0126; G02F 1/025; G02F 1/225; G02F 1/0134; G02F 1/035; G02F 1/055; G02B 27/1006; G02B 6/0001
See application file for complete search history.

(56) References Cited

U.S. PATENT DOCUMENTS

| | | | |
|---|---|---|---|
| 6,876,679 B1 | 4/2005 | Bowler et al. | |
| 6,954,592 B2 | 10/2005 | Tan et al. | |
| 7,912,374 B1* | 3/2011 | Wang et al. | 398/85 |
| 8,488,244 B1* | 7/2013 | Li et al. | 359/618 |
| 2002/0141062 A1 | 10/2002 | Christoffersen et al. | |
| 2003/0161603 A1 | 8/2003 | Nadeau et al. | |
| 2003/0206688 A1 | 11/2003 | Hollars et al. | |
| 2004/0101247 A1 | 5/2004 | Chen et al. | |
| 2013/0177320 A1 | 7/2013 | Du et al. | |
| 2013/0194665 A1* | 8/2013 | Gong et al. | 359/491.01 |
| 2013/0208273 A1* | 8/2013 | Dominguez-Caballero et al. | 356/311 |
| 2013/0215923 A1* | 8/2013 | Cobb | 372/49.01 |

OTHER PUBLICATIONS

Pamidighantam V. Ramana, Li Jing, Jayakrishnan Chandrappan, Lim Teck Guan, Zhang Jing, John Lau Hon Shing, Dim Lee Kwong, Optical Design of a Miniature Semi-Integrated Tunable Laser on a Silicon Optical Bench, Photonics Packaging, Integration, and Interconnects VIII, 2009, p. 1-7, vol. 6899, 68990S, SPIE, United States.

* cited by examiner

*Primary Examiner* — Eric Wong
*Assistant Examiner* — Mary A El Shammaa

(57) ABSTRACT

Known semiconductor wafer process technologies are used to manufacture an optical MUX/DeMUX with very precise dimensional control. The manufacturing process eliminates the need to polish optical surfaces of the MUX/DeMUX, which reduces the overall manufacturing costs and the amount of time that is required to manufacture the MUX/DeMUX.

29 Claims, 13 Drawing Sheets

OPTICAL MULTIPLEXER AND DEMULTIPLEXER AND A METHOD FOR FABRICATING AND ASSEMBLING THE MULTIPLEXER/DEMULTIPLEXER

TECHNICAL FIELD OF THE INVENTION

The invention relates to optics, and more particularly, to an optical multiplexer (MUX) and demultiplexer (DeMUX) for performing optical MUXing and DeMUXing operations, and a method for fabricating the MUX/DeMUX.

BACKGROUND OF THE INVENTION

An optical MUX is a device that receives multiple optical signals of multiple respective wavelengths being carried on multiple respective optical channels and combines them onto a single optical channel. Optical MUXes have a variety of uses, one of which is to perform wavelength division multiplexing (WDM) in optical communications networks. Optical MUXes may be located at various nodes of the network for MUXing multiple optical signals of different wavelengths onto a single optical waveguide, which is typically an optical fiber. An optical demultiplexer (DeMUX) performs optical operations that are the opposite of those performed by an optical MUX. An optical DeMUX receives multiple optical signals of multiple respective wavelengths being carried on a single optical channel and separates them out onto multiple respective optical channels. Thus, an optical DeMUX performs wavelength division demultiplexing operations.

There are several ways to build an optical MUX or DeMUX. Optical MUXes and DeMUXes may be built of bulk optical components or integrated optical elements. Integrated optic systems such as photonic logic circuits (PLCs) use diffractive (Echelle) gratings and arrayed waveguides (AWGs) to perform the optical multiplexing and demultiplexing operations. Similarly, wavelength-selective optical filters and optical reflectors may be used to perform the optical multiplexing and demultiplexing operations.

In order to ensure that the optical MUXing and DeMuxing operations are performed with high performance (low insertion loss when coupled through singlemode fibers), the optical elements must be constructed with very high dimensional and positional precision, especially in the MUX assembly, which requires that there be very tight dimensional control over the manufacturing process. To date, such tight dimensional control has not been consistently achieved. The industry relies on active alignment of the components in the individual channels to achieve the performance required.

Accordingly, a need exists for an optical MUX and an optical DeMUX that can be manufactured with high precision using existing manufacturing technologies.

SUMMARY OF THE INVENTION

The invention is directed to an optical MUX/DeMUX. In accordance with an illustrative embodiment, the optical MUX comprises a base, N light sources, a lens, and a filter block. The base has at least an upper surface and a lower surface. The N light sources are mounted on the upper surface of the base, where N is an integer that is greater than or equal to two. Each light source emits a light beam of a particular operating wavelength (WL), where the operating WLs are different from one another. The lens is transparent to the operating WLs and is mounted on the upper surface of the base. The lens receives the light beams and collimates the light beams into N respective collimated light beams. The filter block is mounted on the upper surface of the base and is transparent to the operating WLs. The filter block receives the N collimated light beams from the lens and has N input optical pathways along which the respective received collimated light beams travel. The filter block has a main optical pathway that is at a non-zero-degree angle to the input optical pathways and that extends from a first end of the filter block to a second end of the filter block. Each of the input optical pathways intersects the main optical pathway at one of N respective optical intersections. The filter block includes N−1 filters disposed at N−1 of the optical intersections, with each filter reflecting at least a portion of the collimated light beam traveling along the respective input optical pathway such that the reflected collimated light beam is directed toward the second end of the filter block. Each filter passes most or all of the collimated light beam or beams traveling along the main optical pathway in a direction toward the second end of the filter block. The filter block has an output optical pathway along which portions of all of the collimated light beams of all of the WLs travel out of the filter block.

In accordance with another illustrative embodiment, the optical MUX comprises a base, at least fourth light sources, a lens, and a filter block. The base has at least an upper surface and a lower surface. The four light sources, $LS_1$-$LS_4$, which are mounted on the upper surface of the base, produce four light beams, $LB_1$-$LB_4$, respectively, of four respective operating wavelengths, $WL_1$-$WL_4$, where $WL4<WL3<WL2<WL1$. The lens that is transparent to light of $WL_1$-$WL_4$, and is mounted on the upper surface of the base. The lens receives $LB_1$-$LB_4$ and collimates $LB_1$-$LB_4$ into four respective collimated light beams, $CLB_1$-$CLB_4$. The filter block is mounted on the upper surface of the base and is transparent to light of $WL_1$-$WL_4$. The filter block receives CLB1-CLB4 such that CLB1-CLB4 travel along four respective input optical pathways, $IOP_1$-$IOP_4$, of the filter block. The filter block has a main optical pathway that extends from a first end of the filter block to a second end of the filter block and intersects with each of $IOP_1$-$IOP_4$, at four respective optical intersections, $OI_1$-$OI_4$, of the filter block. Three optical filters, $OF_1$-$OF_3$, of the filter block are disposed at $OI_1$-$OI_3$, respectively, and $OI_1$ is in between a first optical reflector of the filter block disposed at the first end of the filter block and a second optical reflector of the filter block disposed at the second end of the filter block. $OI_2$ is in between $OI_1$ and the second optical reflector. $OI_3$ is in between $OI_2$ and the second reflector.

The first reflector reflects at least a portion of $CLB_1$ traveling along $IOP_1$ onto the main optical pathway in a direction $OF_1$. $OF_1$ passes most if not all of the portion of $CLB_1$ directed thereon by the first reflector and reflects at least a portion of $CLB_2$ traveling along $IOP_2$ onto the main optical pathway in a direction toward $OF_2$. $OF_2$ passes most if not all of the reflected portions of $CLB_1$ and $CLB_2$ and reflects at least a portion of $CLB_3$ traveling along $IOP_3$ onto the main optical pathway in a direction toward the $OF_3$. $OF_3$ passes most if not all of the reflected portions of $CLB_1$, $CLB_2$ and $CLB_3$ and reflects at least a portion of $CLB_4$ traveling along $IOP_4$ onto the main optical pathway in a direction toward the second optical reflector, and the second optical reflector reflects the reflected portions of $CLB_1$, $CLB_2$, $CLB_3$, and $CLB_4$ onto the output optical pathway.

In accordance with an illustrative embodiment, the optical DeMUX comprises a base, N light detectors, a filter block, and a lens. The base has at least an upper surface and a lower surface. The N light detectors are mounted on the upper surface of the base, where N is an integer that is greater than or equal to two. Each light detector is configured to detect a light beam of a particular operating WL, and where the operating WLs are different from one another. The filter block is mounted on the upper surface of the base and is transparent to the operating WLs. The filter block receives N collimated light beams (CLBs) through an input port of the filter block and coupes the N received CLBs onto a main optical pathway (OP) of the filter block that extends between a first end and a second end of the filter block. The main OP intersects N output OPs of the filter block at N respective optical intersections (OIs) of the filter block at non-zero-degree angles to the output OPs. The filter block includes at least N−1 optical filters (OFs), where the OFs are disposed at N−1 of the optical intersections, respectively. Each OF reflects at least a portion of the CLB of one of the WLs onto a respective one of the output OPs and passes at least a portion of the CLBs of the other WLs. Any portion of any CLB that passes through all of the OFs is reflected by an optical reflector disposed at the first end of the main OP onto a respective output OP. The lens is transparent to the operating WLs and is mounted on the upper surface of the base. The lens receives the CLBs reflected onto the respective output OPs of the filter block and directs at least respective portions of the respective CLBs onto the respective light detectors.

In accordance with another illustrative embodiment, the optical DeMUX comprises a base, at least four light detectors, a filter block, and a lens. The four light detectors, $LD_1$-$LD_4$, are mounted on the upper surface of the base. The light detectors $LD_1$-$LD_4$ are configured to detect respective light beams of respective operating wavelengths, $WL_1$-$WL_4$, that are different from one another. The filter block is mounted on the upper surface of the base and is transparent to the operating WLs. The filter block receives at least four collimated light beams, $CLB_1$-$CLB_4$, through an input port of the filter block and couples $CLB_1$-$CLB_4$ onto a main optical pathway (OP) of the filter block that extends between a first end and a second end of the filter block. The main OP intersects four output OPs, $OP_1$-$OP_4$, of the filter block at four respective optical intersections, $OI_1$-$OI_4$, of the filter block at non-zero-degree angles to $OP_1$-$OP_4$.

The filter block includes at least three optical filters, $OF_1$-$OF_3$, disposed at $OI_2$-$OI_4$, respectively. A first reflector of the filter block is disposed at the first end of the filter block at $OI_1$. $OI_2$ is in between $OI_1$ and a second optical reflector disposed at the second end of the filter block. $OI_3$ is in between $OI_2$ and the second reflector. The second optical reflector reflects at least portions of $CLB_1$-$CLB_4$ received through the input port of the filter block onto the main OP toward the first optical reflector. $OF_3$ passes most or all of the reflected portions of $CLB_1$-$CLB_3$ traveling along the main OP and reflects most or all of the reflected portion of $CLB_4$ onto the output $OP_4$. $OF_2$ passes most or all of the passed portions of $CLB_1$ and $CLB_2$ traveling along the main OP and reflects most or all of the passed portion of $CLB_3$ onto output $OP_3$. $OF_1$ passes most or all of the passed portion of $CLB_1$ and reflects most or all of the passed portion of $CLB_2$ onto output $OP_2$. The first optical reflector reflects most or all of the portion of $CLB_1$ passed by $OF_1$ onto output $OP_1$. The lens that is transparent to $WL_1$-$WL_4$ and is mounted on the upper surface of the base. The lens receives at least portions of $CLB_1$-$CLB_4$ reflected onto output $OP_1$-$OP_4$, respectively, and directs at least portions of $CLB_1$-$CLB_4$ onto $LD_1$-$LD_4$, respectively.

These and other features and advantages of the invention will become apparent from the following description, drawings and claims.

DETAILED DESCRIPTION OF AN ILLUSTRATIVE EMBODIMENT

Figure 1:
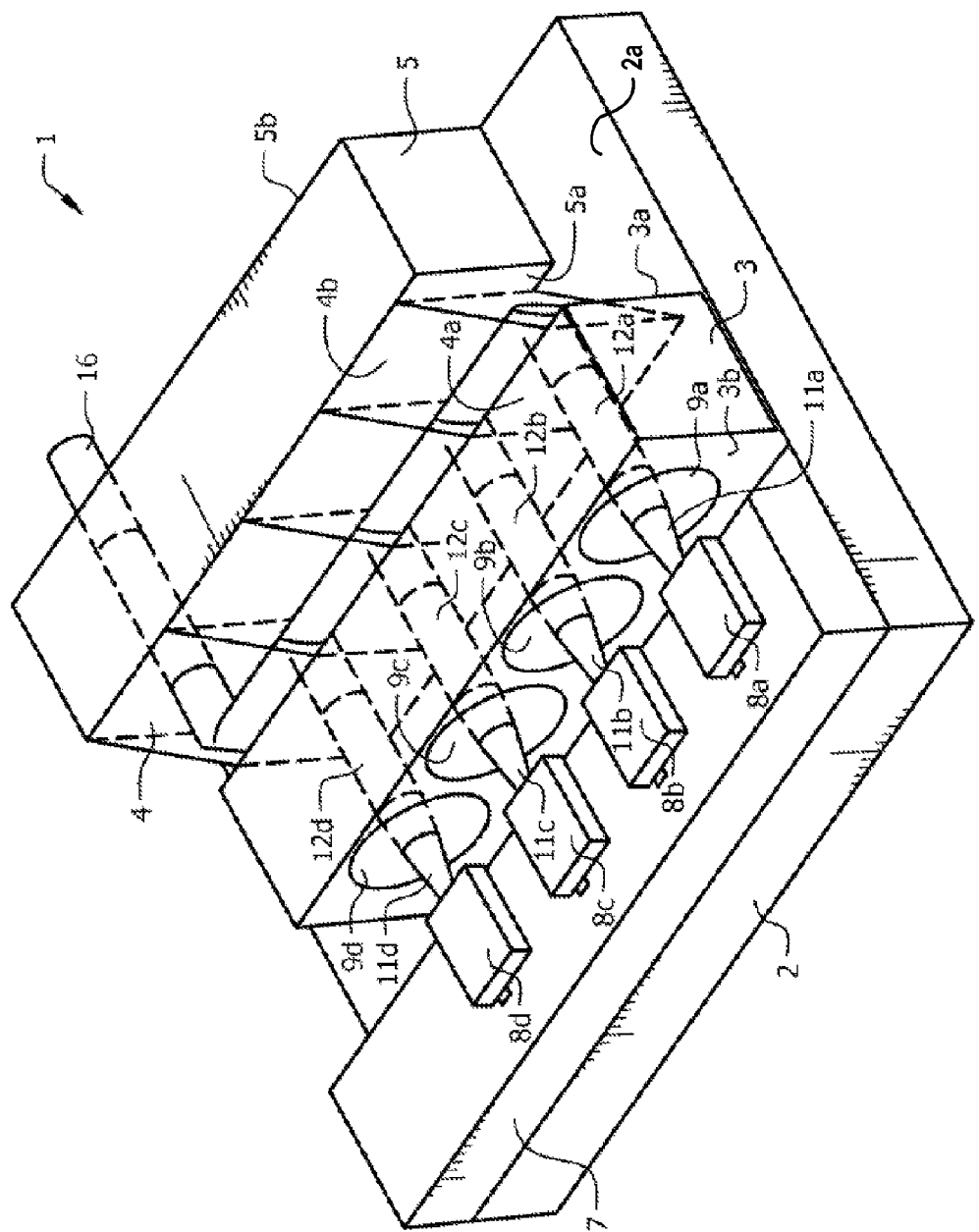
FIG. 1 illustrates a top perspective view of the optical MUX in accordance with an illustrative embodiment.

In accordance with embodiments described herein, known semiconductor wafer process technologies are used to manufacture an optical MUX/DeMUX with very precise dimensional control. The manufacturing process eliminates the need to polish optical surfaces of the MUX/DeMUX, which reduces the overall manufacturing costs and the amount of time that is required to manufacture the MUX/DeMUX. Illustrative embodiments of the optical MUX/DeMUX and the process for making it will now be described with reference to the figures, in which like reference numerals represent like components, elements or features.

FIG. 1 illustrates a top perspective view of the optical MUX 1 in accordance with an illustrative embodiment. The MUX 1 includes a base 2, a lens 3 mounted on an upper surface 2a of the base 2, a filter block 4 mounted on the upper surface 2a of the base 2, and an output coupler 5 mounted on the upper surface 2a of the base 2. A first outer surface 4a of the filter block 4 is in contact with a first outer surface 3a of the lens 3. A second outer surface 4b of the filter block 4 that is opposite and parallel to the first outer surface 4a of the filter block 4 is in contact with a first outer surface 5a of the output coupler 5. A second outer surface 5b of the output coupler 5 acts as an output facet of the MUX 1.

A second outer surface 3b of the lens 3 that is opposite and parallel to the first outer surface 3a of the lens 3 faces an optoelectronic (OE) device holder 7 that is mounted on the upper surface 2a of the base 2. The OE device holder 7 functions as a mounting surface for a plurality of OE devices 8a-8d. In accordance with this illustrative embodiment, the MUX 1 is a 4-to-1 MUX 1 and the OE devices 8a-8d are laser diodes that produce light of four respective different wavelengths, WL1-WL4. The lens 3 has four refractive optical elements 9a-9d that receive respective diverging light beams 11a-11d produced by OE devices 8a-8d, respectively. The optical elements 9a-9d collimate the respective diverging light beams 11a-11d into respective collimated light beams 12a-12d, which are then directed by the lens 3 into the filter block 4.

Figure 2:
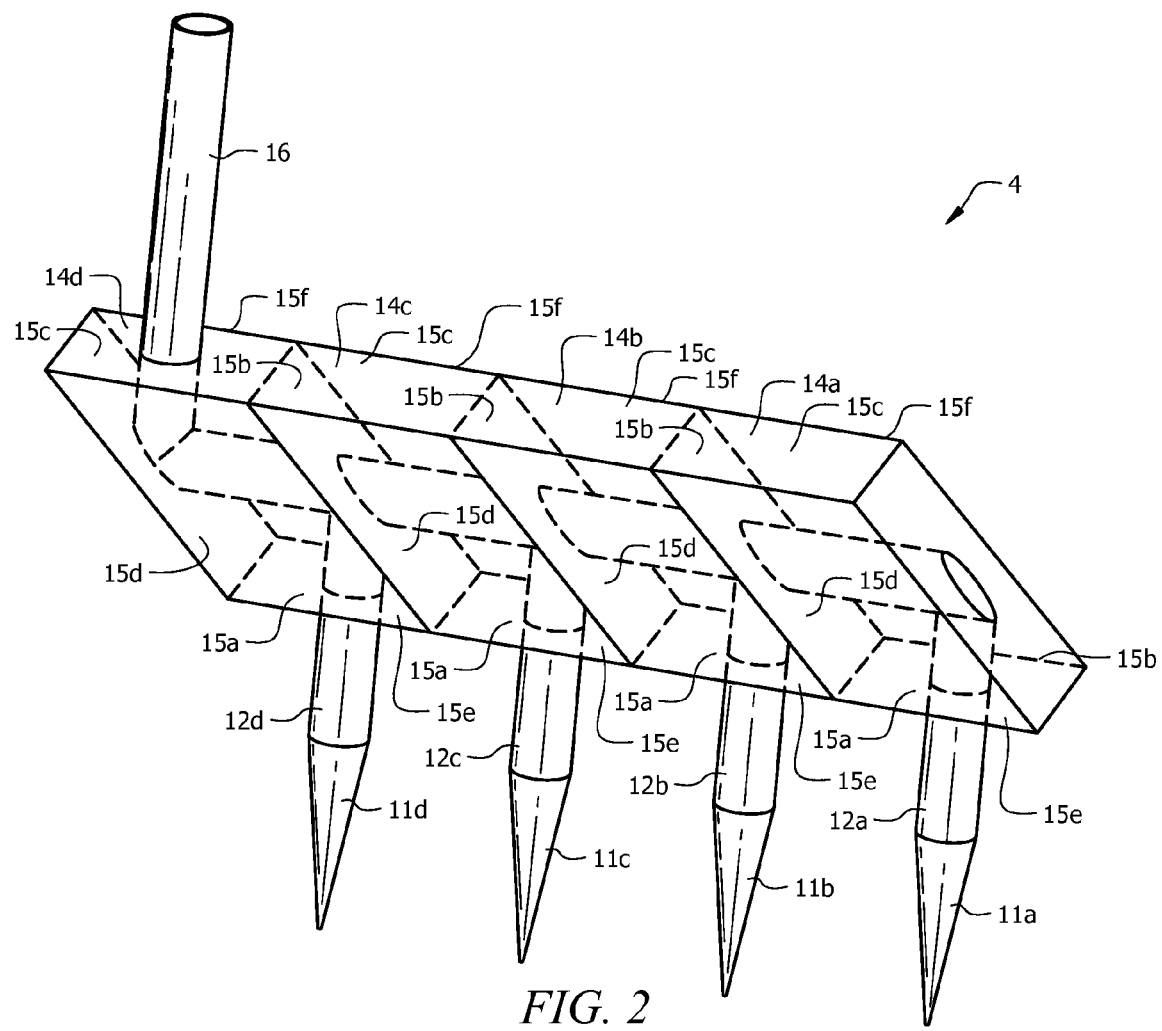
FIG. 2 illustrates a top perspective view of a filter block of the optical MUX shown in FIG. 1.

FIG. 2 illustrates a top perspective view of the filter block 4 of the optical MUX 1 shown in FIG. 1. In accordance with this illustrative embodiment, the filter block 4 is made up of four filter sub-blocks 14a-14d, and adjacent filter sub-blocks 14a-14d are in contact with one another. Each filter sub-block 14a-14d has six sides 15a-15f. For each sub-block 14a-14d, the sides 15a and 15c are parallel to one another, the sides 15b and 15d are parallel to one another, and the sides 15e and 15f are parallel to one another. For each sub-block 14a-14d, the side 15a is at an angle to the side 15b that is less than 90° and typically is about 45°. For each sub-block 14a-14d, the side 15a is at an angle to the side 15d that is greater than 90° and typically is about 135°. The side 15d of filter sub-block 14a is in contact with the side 15b of filter sub-block 14b. The side 15d of filter sub-block 14b is in contact with the side 15b of filter sub-block 14c. The side 15d of filter sub-block 14c is in contact with the side 15b of filter sub-block 14d.

The collimated light beams 12a-12d pass through the respective sides 15a of the respective filter sub-bocks 14a-14d and are incident on the respective internal surfaces of the respective sides 15b. The internal surface of side 15b of sub-block 14a is a total internal reflection (TIR) surface that reflects the beam 12a in the direction shown toward sub-block 14b. In accordance with this illustrative embodiment, the wavelengths WL1-WL4 increase from right to left with reference to the drawing page containing FIG. 2. In other words, WL1<WL2<WL3<WL4. As will be described below with reference to FIGS. 3A-3J, a filter coating (not shown) is disposed in between side 15d of filter sub-block 14a and side 15b of filter sub-block 14b that acts as a highpass filter for the beam that is reflected by the internal surface of side 15b of filter sub-block 14a. The filter coating passes light of WL1 and blocks (i.e., reflects) most or all of light of WL2. This filter coating may be designed to pass some light of WL2 to allow it to be monitored by a monitor photodiode (not shown for clarity). Likewise, a filter coating (not shown) is disposed in between side 15d of filter sub-block 14b and side 15b of filter sub-block 14c that acts as a highpass filter for the beams of WL1 and WL2 and blocks (i.e., reflects) most or all of the light of WL3. This filter coating may pass some light of WL3 to allow it to be monitored by a monitor photodiode (not shown for clarity). Likewise, a filter coating (not shown) is disposed in between side 15d of filter sub-block 14c and side 15b of filter sub-block 14d that acts as a highpass filter for the beams of WL1-WL3 in that is passes light of WL1-WL3 and blocks (i.e., reflects) most or all of the light of WL4. This filter coating may pass some light of WL4 to allow it to be monitored by a monitor photodiode (not shown for clarity).

The surface of side 15d of filter sub-block 14d is a TIR surface that reflects the light of WL1-WL4 directed onto it. The light reflected by the TIR surface of side 15d of filter sub-block 14d is coupled via the output coupler 5 out of the MUX 1 as the output beam 16 of the MUX 1. The output beam 16 is a collimated light beam made up of light of WL1-WL4. The output coupler 5 is transparent to light of WL1-WL4.

The outer surfaces of sides 15a and 15c of the filter block 4 are coated with a refractive index (RI)-matching epoxy, which serves to bond these surfaces to the lens 3 and to the output coupler 5 and to prevent light from being reflected at these interfaces. The RI-matching epoxy that is disposed in between the outer surfaces of sides 15a of the filter block 4 and the first outer surface 3a of the lens 3 provides RI-matching of the refractive indices of the material of which the filter block 4 is made. Likewise, the RI-matching epoxy that is disposed in between the outer surfaces of sides 15c of the filter block 4 and the first outer surface 5a of the output coupler 5 provides RI-matching of the refractive indices of the material of which the filter block 4 is made. The first and second outer surfaces 3a and 3b of the lens 3 and the second outer surface 5b of the output coupler 5 are coated with an anti-reflection (AR) coating to prevent light from being reflected at those surfaces.

The outer surfaces of sides 15a of filter sub-blocks 14a, 14b, 14c and 14d and the outer surface of side 15c of filter sub-block 14d would normally need to be polished in order to ensure that they properly perform their respective optical operations with high efficiency. However, in accordance with illustrative embodiments of the manufacturing process that is used to fabricate the filter block 4, these surfaces do not need to be polished because they are attached to the lens 3 and to the output coupler 5 with an RI-matching epoxy. Obviating the need to polish these surfaces at the device level reduces manufacturing costs and facilitates the assembly process by reducing the number of steps that need to be performed to assemble the MUX 1. Illustrative embodiments of the manufacturing process will now be described with reference to FIGS. 3A-3J.

Figure 3A:
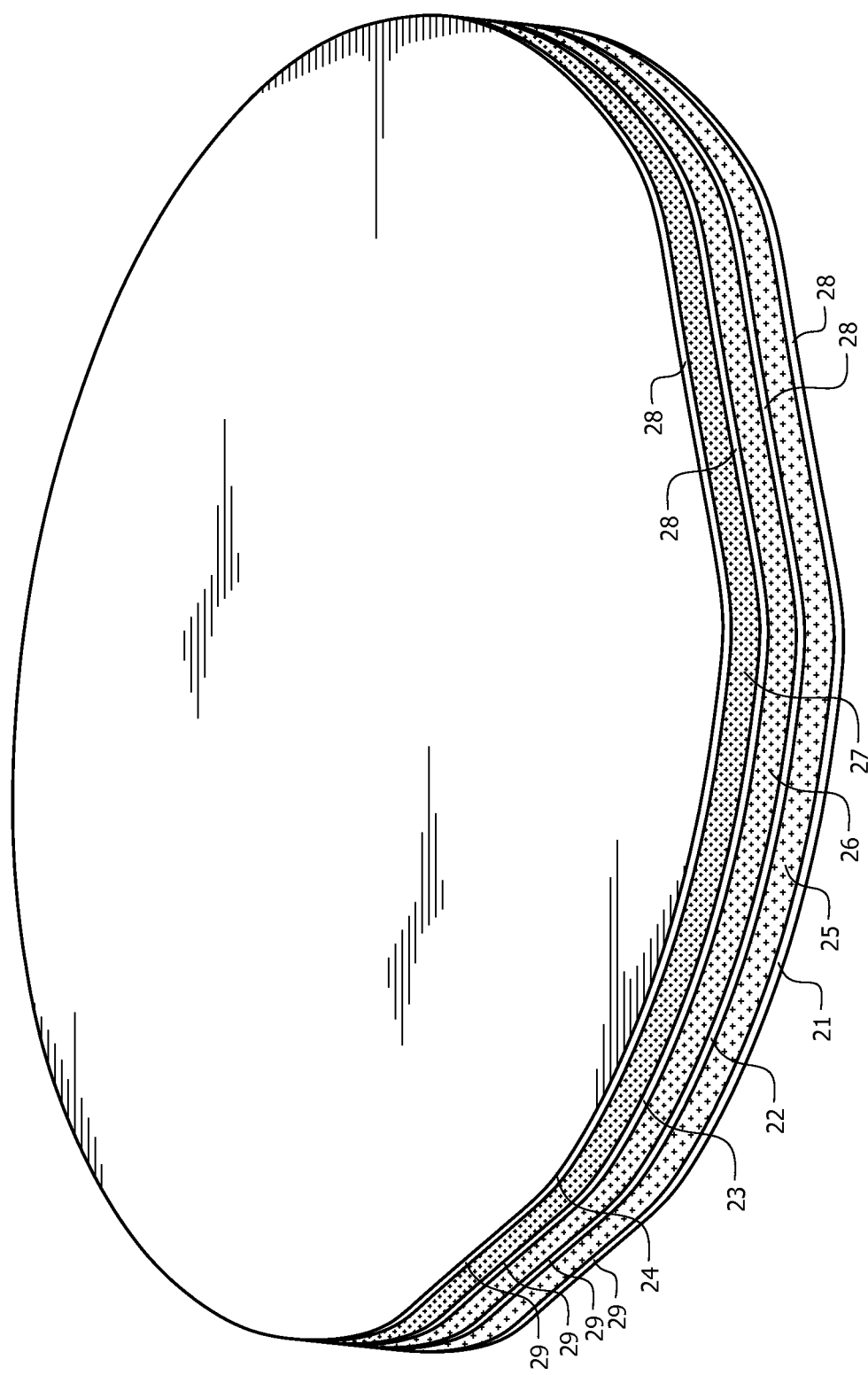
FIG. 3A illustrates a top perspective view of four glass wafers that are used to manufacture the filter block shown in FIGS. 1 and 2.

FIG. 3A illustrates a top perspective view of four glass wafers 21-24 that are used to manufacture the filter block 4 shown in FIG. 1. The glass wafers 21-24 have polished upper and lower surfaces. A wafer coating process is performed to place filter coatings 25-27 on the upper surfaces of wafers 21-23, respectively. Each of the coatings 25-27 is typically made up of many layers (e.g., 200 layers) of alternating materials of varying refractive indices. The manner in which such filter coatings are made using semiconductor fabrication processes is well known. Each filter coating 25-27 is designed to pass light below a certain wavelength and reflect light above a certain wavelength, i.e., to operate as a highpass filter. In the present illustrative embodiment, the frequency at which the filter transitions from passing the light to reflecting the light is called the cut off frequency. In the present illustrative embodiment, the filters are arranged such that the filter at the right has a higher cut off frequency than the filter at the left when looking at the page that contains FIG. 2. This assumes that the beam 11a has the highest frequency or the shortest wavelength and that beam 11d has the lowest frequency or highest wavelength. If instead, beam 11a has the lowest frequency or the longest wavelength, the filter will be made as a lowpass filter, in which case lower frequencies will pass through the filter and higher frequencies will be reflected by the filter.

It should be noted that while FIG. 3A shows the filter coatings 25-27 being placed on upper surfaces of wafers 21-23, respectively, an alternative approach would be to place filter coatings on the upper and lower surfaces of one or more of the wafers and no filter coatings on one or more of the other wafers. For example, filter coatings could be placed on the upper and lower surfaces of wafer 23, no filter coatings on wafers 22 and 24, and one filter coating on the upper surface of wafer 21. The goal is to have a wafer coating disposed in between the upper surface of a wafer and the lower surface of the adjacent wafer, but that can be achieved in different ways.

Figure 3B:
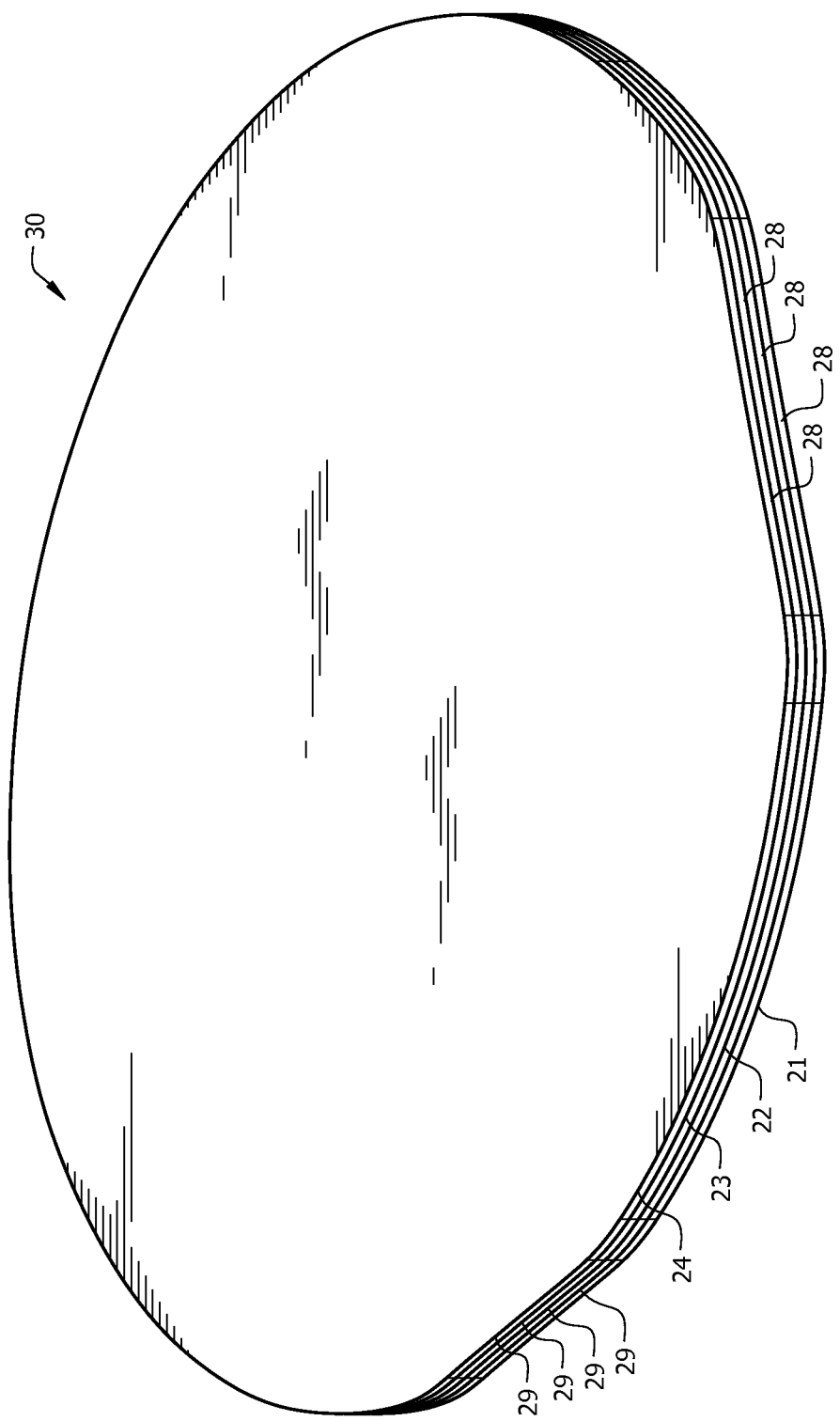
FIG. 3B illustrates a top perspective view of the wafers shown in FIG. 3A stacked one on top of the other in the proper wavelength range order and bonded together.
Figure 3C:
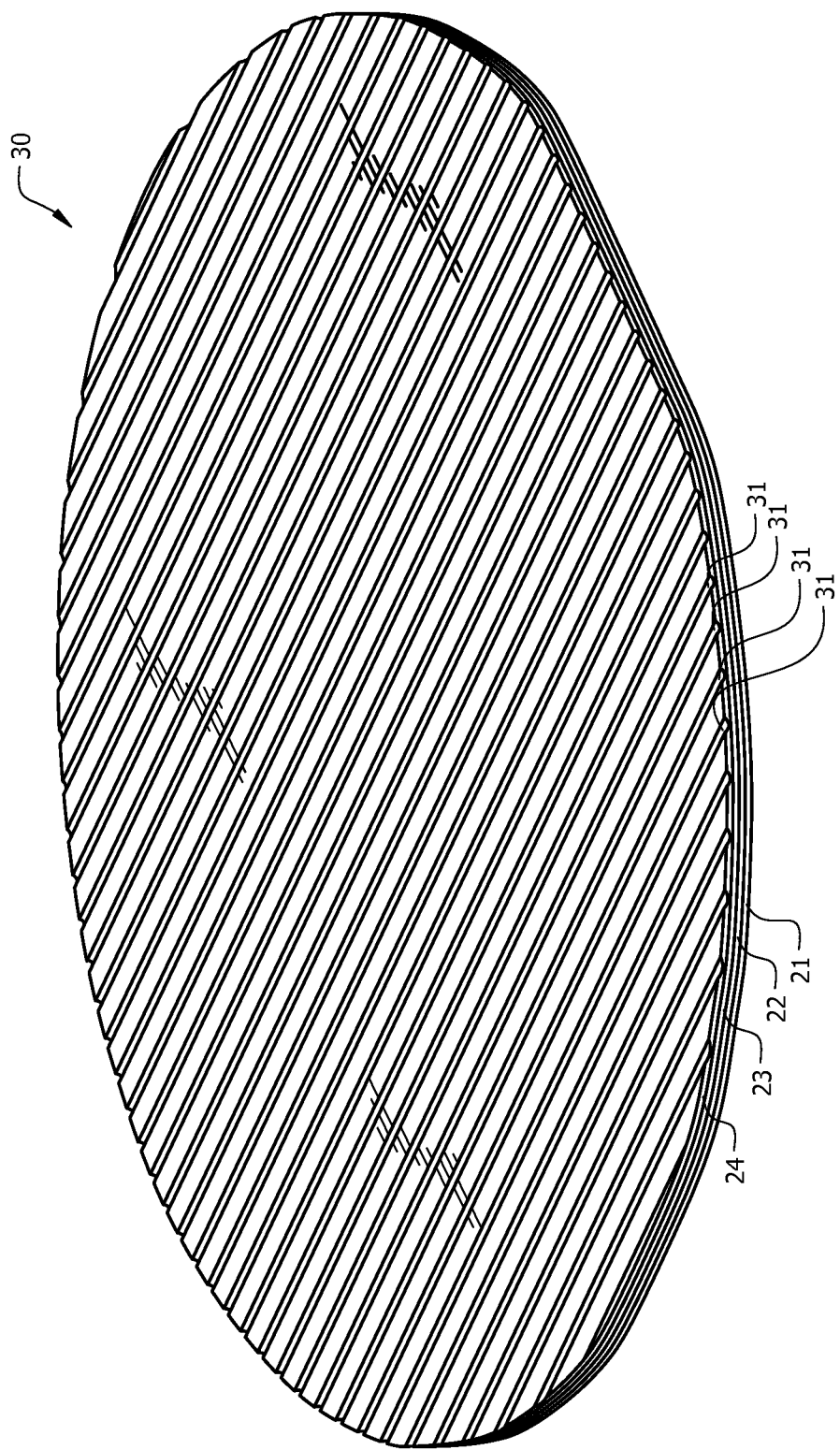
FIG. 3C illustrates a top perspective view of the stack of wafers shown in FIG. 3B having parallel scores formed on an upper surface of the top wafer of the stack.
Figure 3D:
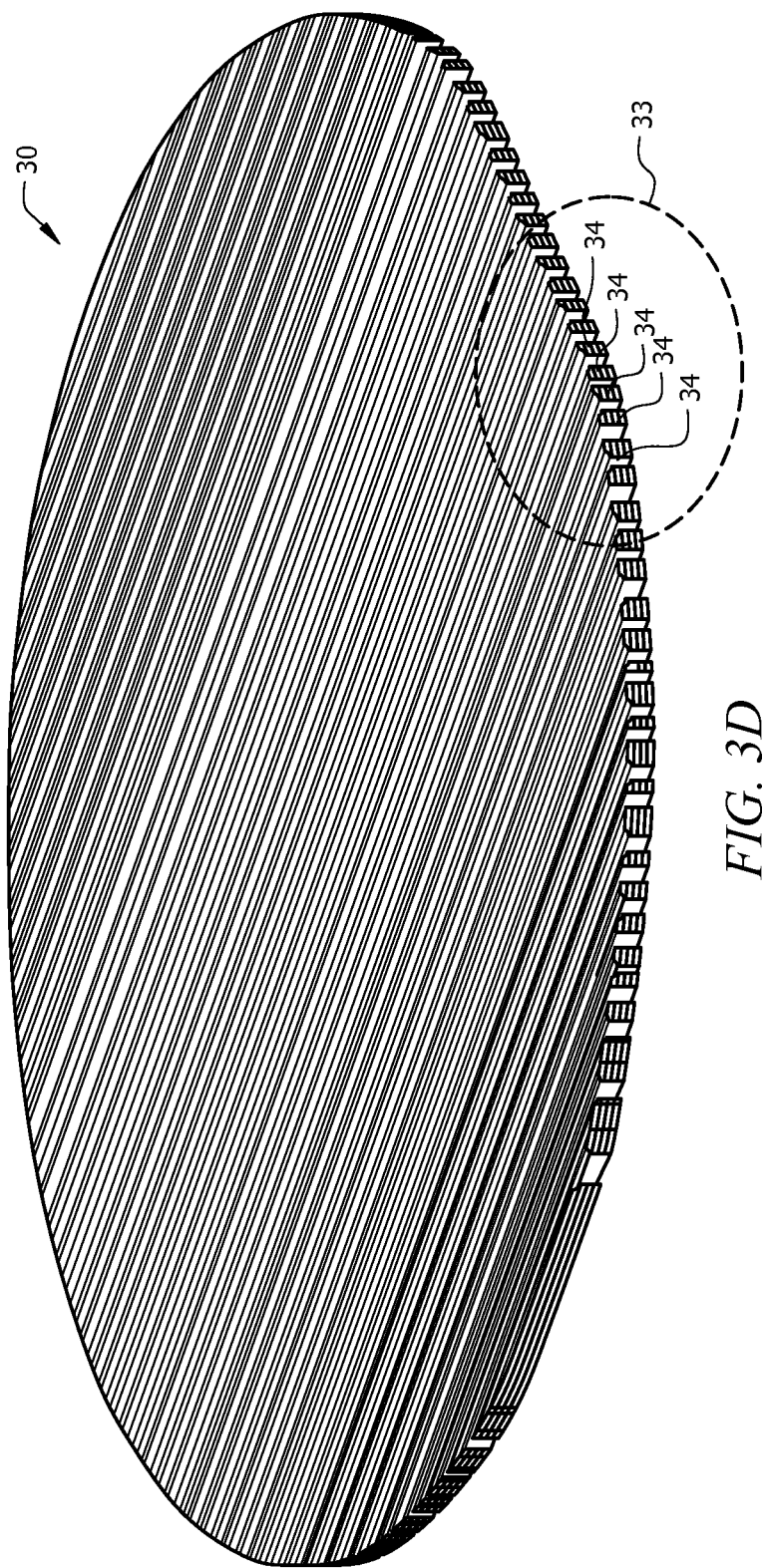
FIG. 3D illustrates a top perspective view of the stack of wafers shown in FIG. 3C diced along the scores and midway in between the scores.
Figure 3E:
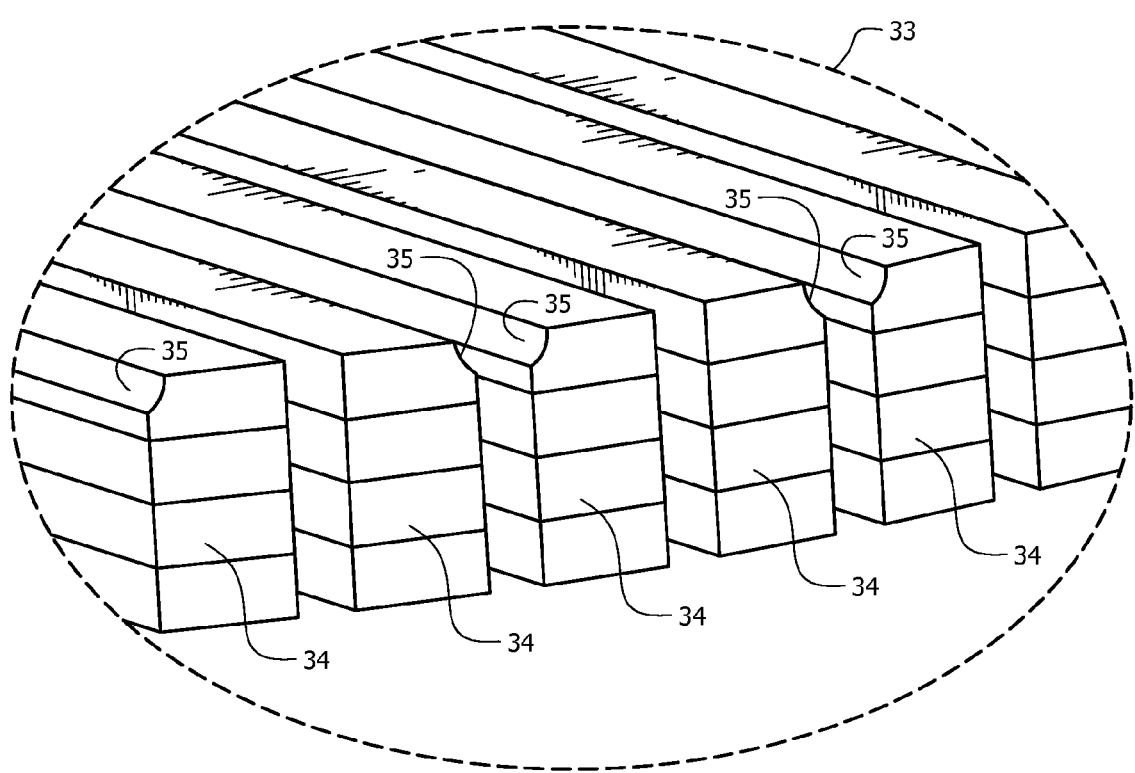
FIG. 3E illustrates an enlarged view of a portion of the view shown in FIG. 3D within the dashed circle, which shows several diced strips from the diced stack.

The wafers 21-24 are stacked one on top of the other in the proper cut off frequency order and bonded together, as shown in FIG. 3B. The bonds may be covalent bonds or adhesive bonds. The positions of the major and minor flats 28 and 29 of the wafers 21-24 may be used to keep track of the filter cut off frequency orders. The upper surface of the top wafer 24 in the stack 30 is then scored with parallel scores 31 that are 500 micrometers (microns) deep at a pitch of 1 millimeter (mm), as shown in FIG. 3C. The stack of wafers 30 is then diced along the scores 31 and midway in between the scores 31, as shown in FIG. 3D. FIG. 3E illustrates an enlarged view of portion 33 of the view shown in FIG. 3D, which shows several diced strips 34 of the stack 30. In accordance with this embodiment, the dicing blade (not shown) that is used to dice the stack 30 has a width that is smaller than the scoring blade (not shown) that is used to score the upper surface of the top wafer 24 such that an identifying feature 35 is formed on each diced strip 34.

Figure 3F:
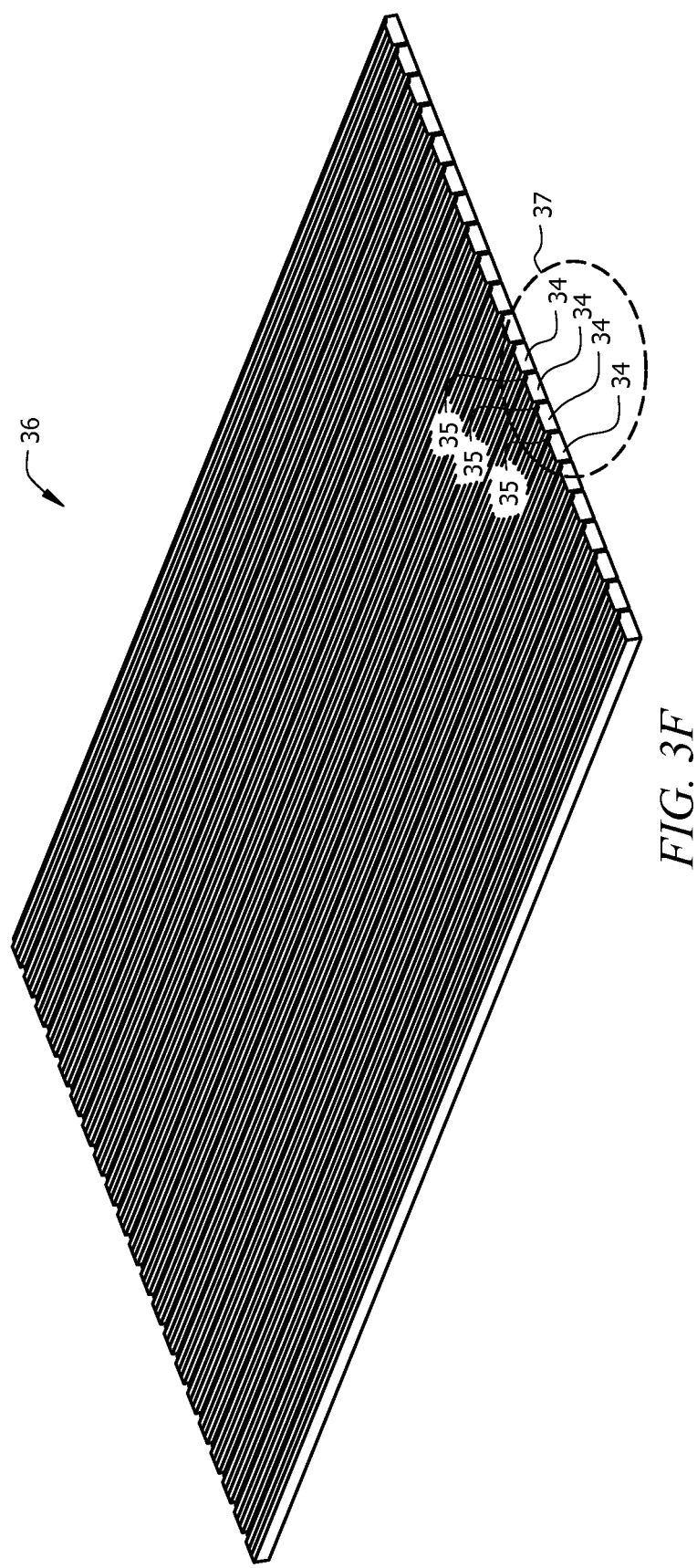
FIG. 3F illustrates a top perspective view of the strips shown in FIGS. 3D and 3E after the strips have been laid on their lengthwise sides, side by side in parallel to one another in an array.
Figure 3G:
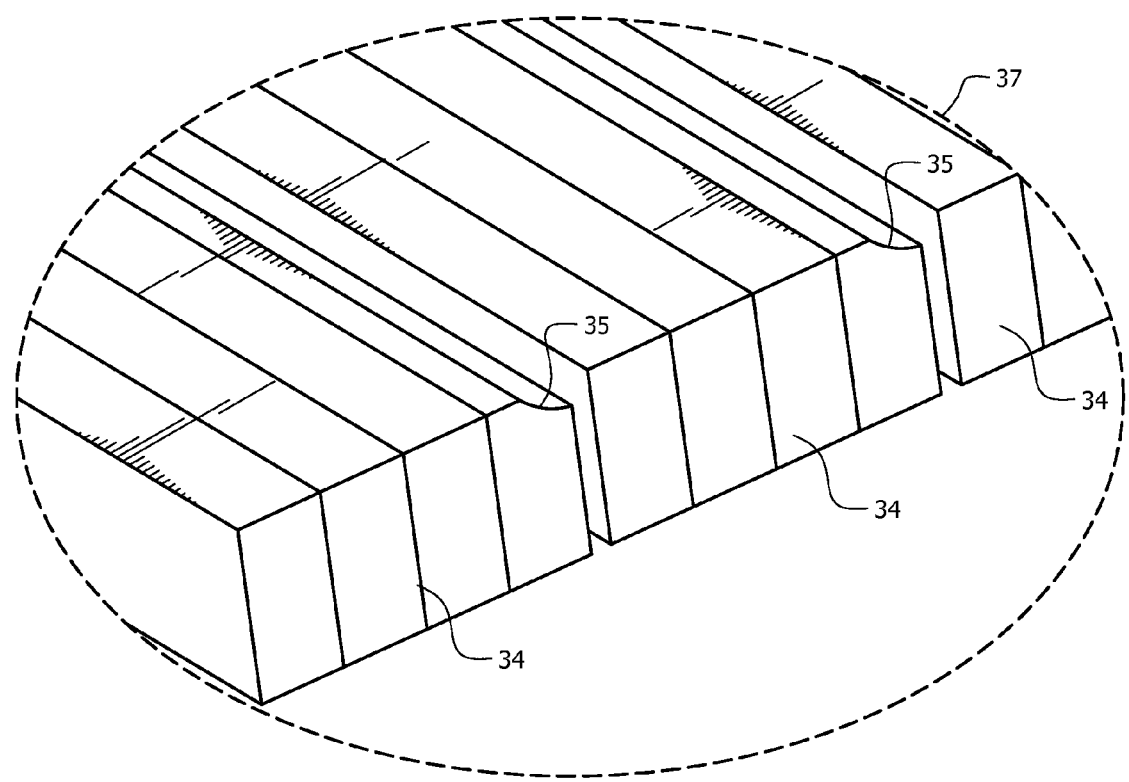
FIG. 3G illustrates an enlarged view of the portion of the view shown in FIG. 3F that is within the dashed circle.
Figure 3H:
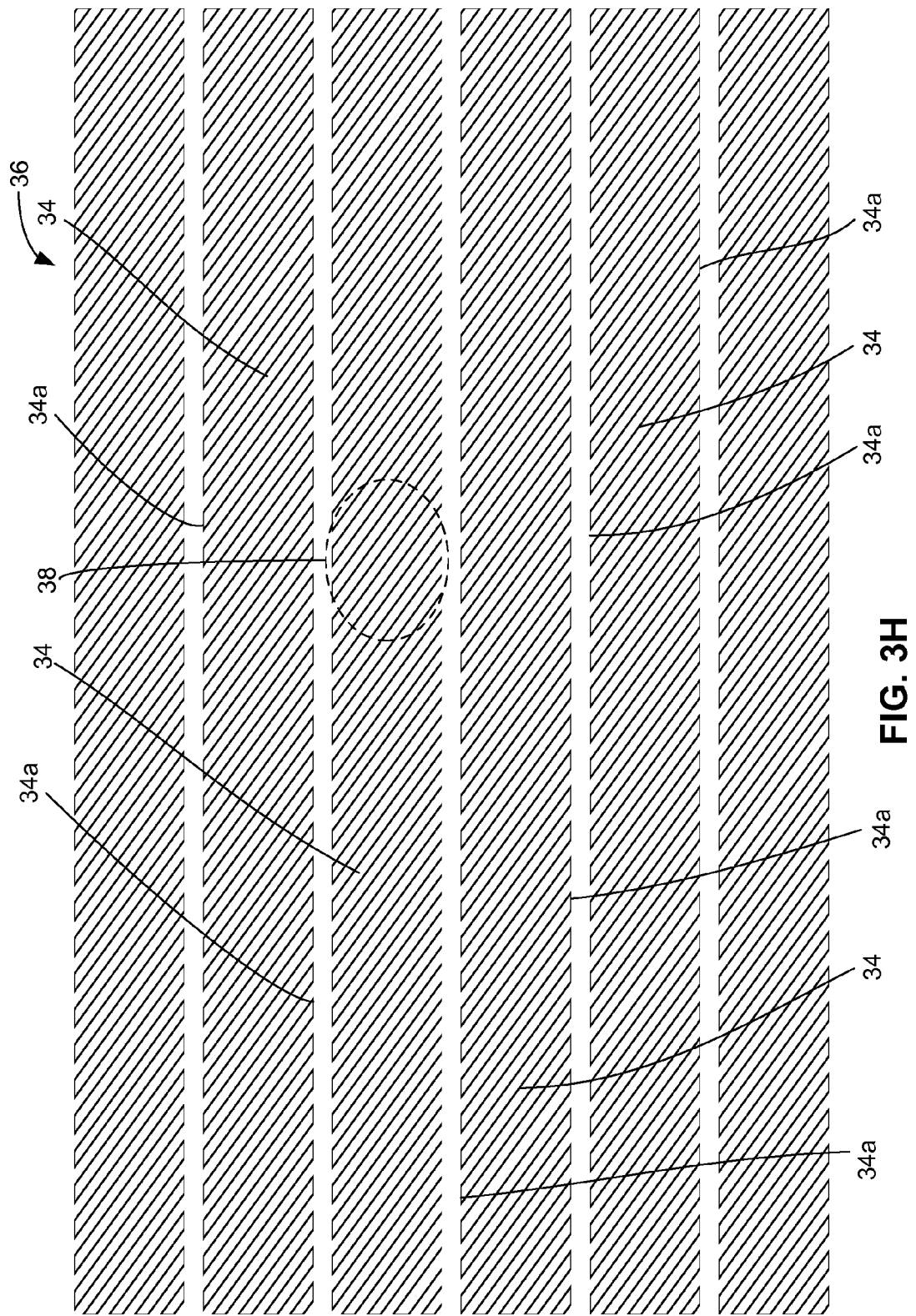
FIG. 3H illustrates a top perspective view of the array of wafer strips shown in FIG. 3F diced at a 45° angle relative to the lengthwise sides of the strips.
Figure 3I:
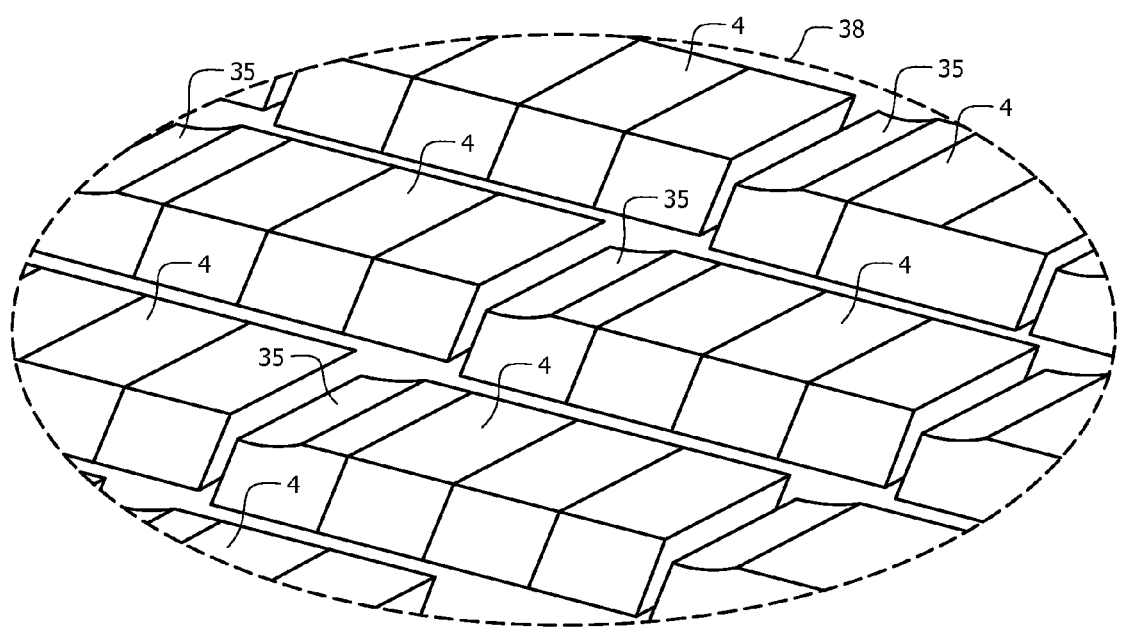
FIG. 3I is an enlarged view of the portion of the diced array shown within the dashed circle in FIG. 3H.
Figure 3J:
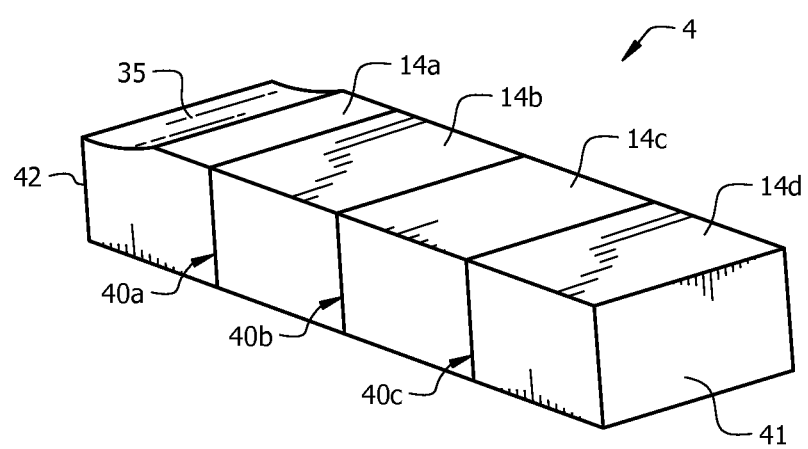
FIG. 3J illustrates a top perspective view of one of the filter blocks obtained from the dicing operation shown in FIG. 3I.

The strips 34 are then laid side by side in parallel to one another in an array 36 with the identifying features 35 facing up, as shown in FIG. 3F. FIG. 3G illustrates an enlarged view of the portion 37 of the view shown in FIG. 3F. The array 36 is then diced at a 45° angle relative to the lengthwise sides 34a of the strips 34 and the residual material left behind by the dicing process is removed, as shown in FIG. 3H. FIG. 3I is an enlarged view of the portion 38 of the diced array shown in FIG. 3H. The result of the dicing operation is a large number of the filter blocks 4, one of which is shown in FIG. 3J. The identifying feature 35 on each filter block 4 may be used to determine the filter cut off frequency order. Each filter block 4 has three filters 40a, 40b and 40c that are made up of the contacting sides of adjacent filter sub-blocks 14a-14d and the filter coatings (not shown) disposed in between them. None of the surfaces of the filter sub-blocks 14a-14d is required to be polished, although some of the surfaces are polished due to those surfaces corresponding to the top or bottom polished surfaces of the respective wafers from which they were diced.

The base 2 of the MUX 1 shown in FIG. 1 may also be formed using semiconductor processing techniques. In accordance with an embodiment, the base 2 is formed by etching the device layer of a silicon-on-insulator (SOI) wafer. These wafers are commercially available through a variety companies such as, for example, Shin-Etsu Company of Japan. The SOI wafers consist of a thinner device layer and a thicker handle wafer with a thin layer of oxide in between. The result of the etching process is the base 2 and the OE device holder 7 shown in FIG. 1. The base 2 corresponds to the handle layer having the layer of silicon dioxide thereon and the OE device holder 7 corresponds to the device layer after it has been etched down to the silicon dioxide layer 45.

The lens 3 is typically formed of glass or silicon. Well known glass or silicon etching techniques may be used to form the lens 3. The output coupler 5 may be formed by dicing glass or silicon wafers.

With reference again to FIG. 1, the first outer surface 5a of the output coupler 5 is bonded by RI-matching epoxy to the second outer surface 4b of the filter block 4. If the output coupler 5 is made of the same material as the filter block 4, then an AR coating is disposed on the second outer surface 5b of the output coupler, but not on the first outer surface 5a of the output coupler 5, as it is not needed on that surface. The first outer surface 3a of the lens 3 is bonded by RI-matching epoxy to the first outer surface 4a of the filter block 4. If the lens 3 is made of the same material as the filter block 4, then an AR coating is disposed on the second outer surface 3b of the lens 3, but not on the first outer surface 3a of the lens 3 because it is not needed. As indicated above, using RI-matching epoxy on the surface 4b of the filter block 4 and on the surface 5a of the output coupler 5 allows surface 4b to be left unpolished. Likewise, using RI-matching epoxy on the surface 4a of the filter block 4 and on the surface 3a of the lens 3 allows surface 4a to be left unpolished. Leaving these surfaces unpolished provides a very significant cost savings.

The base 2 may be any suitable base and need not be manufactured using semiconductor fabrication techniques. Using semiconductor fabrication techniques to manufacture the base 2 and the OE device holder 7 allows them to be mass produced at the wafer level with precisely positioned alignment features. For example, the OE devices 8a-8d are typically laser diodes having waveguide ridges (not shown). When the laser diodes are mounted on the OE device holder 7, the ridges of the laser diodes are disposed in respective trenches (not shown) formed in the OE device holder 7. Such alignment features allow the components of the MUX 1 to be precisely positioned relative to one another to ensure that optical coupling efficiency is very high.

Many variations to the MUX 1 are possible. For example, the highpass filters 40a-40c could be replaced with lowpass filters, in which case the wavelengths WL1-WL4 decrease from right to left with reference to the drawing page containing FIG. 1 such that WL1>WL2>WL3>WL4. Also, while the OE devices 8a-8d have been described as being laser diodes, they may be any suitable light source, including light emitting diodes (LEDs), for example. Although edge-emitting laser diodes are shown in FIG. 1 as the OE devices 8a-8d, other types of laser diodes, such as, for example, vertical cavity surface emitting laser diodes (VCSELs) may instead be used, although the base 2 would need to be configured differently if VCSELs are used. Persons of skill in the art will understand the manner in which such modifications may be made.

In addition, the MUX 1 shown in FIG. 1 may instead operate as a DeMUX by replacing the light sources with light receivers, e.g., P-intrinsic-N (PIN) diodes. When operating as a DeMUX, light of wavelengths WL1-WL4 is coupled by the output coupler 5, which becomes input coupler 5, onto the interior surface of side 15d of filter sub-block 14d. The interior surface of side 15d of filter sub-block 14d then reflects the light of WL1-WL4 onto the filter disposed between side 15b of filter sub-block 14d and side 15d of filter sub-block 14c. That filter passes light of WL3-WL1 and reflects light of WL4 toward the lens 3, which couples the light onto the OE device 8d, which in this case is a PIN diode. The filter disposed in between side 15b of filter sub-block 14c and side 15d of filter sub-block 14b then passes light of WL2-WL1 and reflects light of WL3 toward the lens 3, which couples the light onto the OE device 8c, which in this case is a PIN diode. The filter disposed in between side 15b of filter sub-block 14b and side 15d of filter sub-block 14a then passes light of WL1 and reflects light of WL2 toward the lens 3, which couples the light onto the OE device 8b, which in this case is a PIN diode. The light of WL1 is then reflected by the TIR surface of side 15b of filter sub-block 14a into the lens 3, which couples the light of WL1 onto the OE device 8a, which in this case is a PIN diode.

Figure 4:
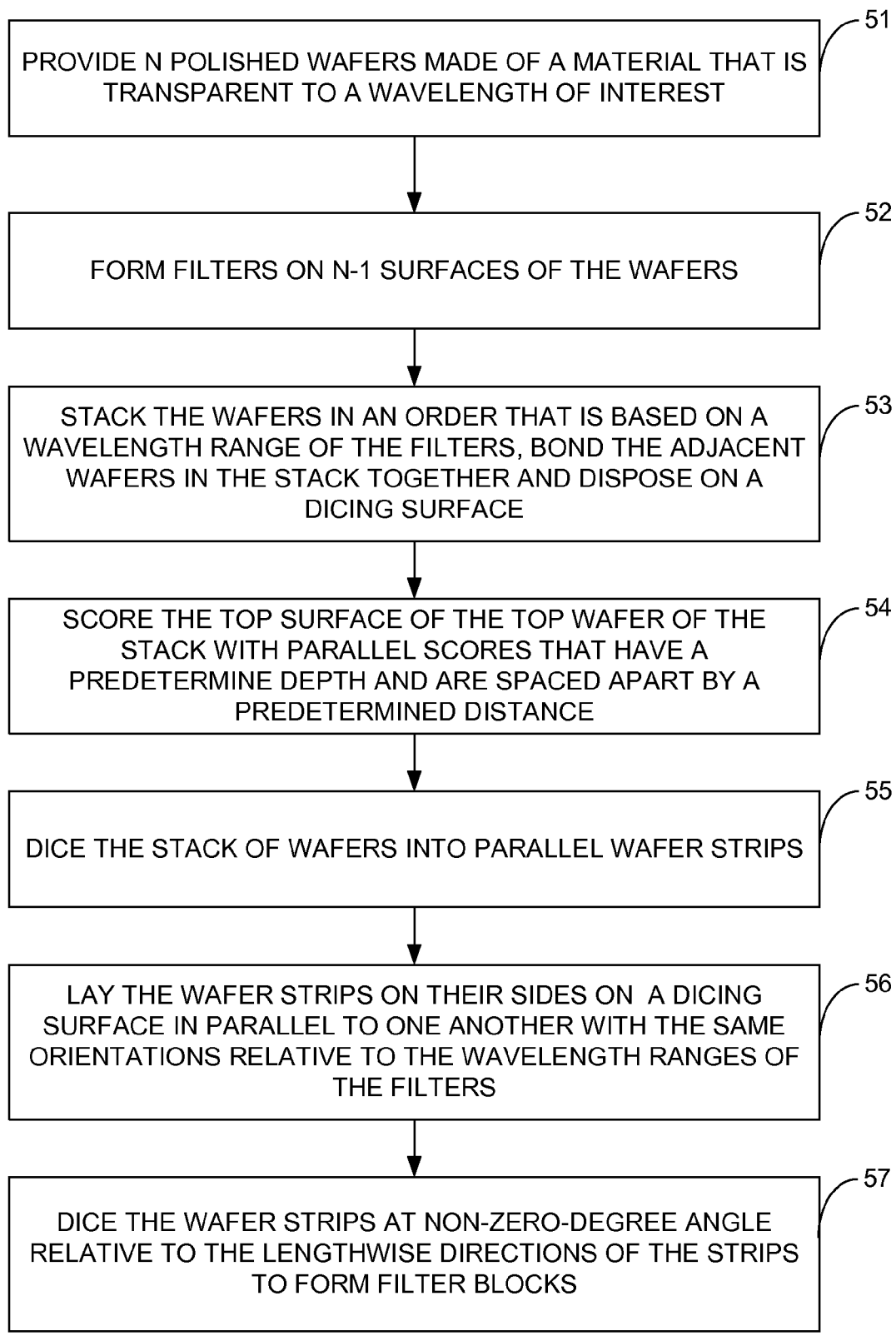
FIG. 4 illustrates a flow diagram that represents the method for fabricating the filter block shown in FIGS. 1 and 2 in accordance with an illustrative embodiment.

FIG. 4 illustrates a flow diagram that represents the method for fabricating the filter block 4 in accordance with an illustrative embodiment. A plurality of pre-polished (both sides polished) wafers made of a material having suitable optical characteristics are provided, as indicated by block 51. Glass wafers will typically be provided, but wafers made of other materials having suitable optical characteristics (i.e., transparent to the wavelength of interest) may be used. Typically, the wafers are made of silicon, glass or fused silica. One factor to be taken into consideration when deciding which type of wafer to use is whether a RI-matching epoxy is available that can be reasonably matched to the wafer material. If the MUX is an N-to-1 MUX, where N is a positive integer that is equal to or greater than 2, then N wafers will be provided.

At least some of the wafers are subjected to a process during which N−1 filters are formed on N−1 surfaces of the wafers, respectively, as indicated by block 52. This can be accomplished in different ways, as described above with reference to FIG. 3A. This process is typically a wafer coating process that grows or deposits filter layers or coatings on the upper and/or lower surfaces of some of the wafers. As discussed above, each filter is typically made up of many layers (e.g., 200 layers) of alternating materials of varying refractive indices. Persons of skill in the art will understand how such processes may be used to form the respective filters on the respective wafers such that each filter is designed to filter a particular wavelength range, i.e., to pass a particular wavelength or wavelength range and to block a particular wavelength or wavelength range.

The wafers are stacked one on top of the other in the proper wavelength range order, bonded together, and disposed on a dicing surface, as indicated by block 53. As described above, the major and minor flats 28 and 29 (FIG. 3A) may be used to ensure that the wafers are properly oriented when they are stacked and bonded together. The order in which the wafers are stacked is the same as the order in which the respective filters 40a-40c (FIG. 3J) appear in the filter block 4. The bonds may be covalent bonds or adhesive bonds. The upper surface of the top wafer in the stack preferably is then scored with parallel scores that have a predetermined depth (e.g., 500 microns) and are a predetermined distance apart (e.g., 1 mm), as indicated by block 54. This step is used to provide the identifying feature 35 (FIG. 3E) described above, which is preferable, but not necessary (i.e., it is optional). Other marking methods are also possible, such as laser marking, for example. The stack of wafers, which is now disposed on a dicing surface, is then diced into strips (FIGS. 3D and 3E) that have lengthwise sides that are parallel to one another, as indicated by block 55. As described above, the stack is typically diced along the scores 31 and midway in between the scores 31 (FIGS. 3D and 3E).

The strips are then laid on their sides on a dicing surface in parallel to one another with the same orientations relative to the wavelength ranges of the filters to form an array of parallel strips, as indicated by block 56. The array is then diced at a non-zero-degree angle relative to the lengthwise directions of the strips, as indicated by block 57. The non-zero-degree angle is typically, but not necessarily, 45°. The result of the dicing operation is a plurality of the filter blocks 4 (FIGS. 1 and 3J), each having a plurality of filter sub-blocks (e.g., filter sub-blocks 14a-14d in FIG. 3J) with filters (e.g., filters 40a, 40b and 40c in FIG. 3J) disposed between adjacent filter sub-blocks.

None of the surfaces of the filter blocks is required to be polished, although some of the surfaces are polished due to those surfaces corresponding to the top or bottom polished surfaces of the respective polished wafers from which they were diced. With reference again to FIG. 3J, surfaces 41 and 42 of the filter block 4 are polished surfaces due to the fact that they correspond to the bottom surface and top surface, respectively, of wafers 21 and 24 (FIG. 3A), respectively. The other exterior surfaces of the filter block 4 are rough due to the dicing process, but they do not need to be polished because they are coated with a layer of RF-index matching epoxy, as described above. Thus, there are no polishing steps to be performed.

Once the filter blocks 4 have been formed, the MUX/DeMUX assembly of the type shown in FIG. 1 is assembled by using RI-matching epoxy to bond the first outer surface 5a of the output coupler 5 to the second outer surface 4b of the filter block 4 and to bond the first outer surface 3a of the lens 3 to the first outer surface 4a of the filter block 4. As indicated above, if the output coupler 5 is made of the same material as the filter block 4, then an AR coating is disposed on the second outer surface 5b of the output coupler, but not on the first outer surface 5a of the output coupler 5, as it is not needed on that surface. Likewise, if the lens 3 is made of the same material as the filter block 4, then an AR coating is disposed on the second outer surface 3b of the lens 3, but not on the first outer surface 3a of the lens 3 because it is not needed.

It should be noted that the block 3 that is referred to above as the lens could just be an block of the material described above for the lens, but with the lens function removed. In that case, the optical block 3 without the optical elements 9a-9d would still be bonded by RI-matching epoxy to the filter block 4 to obviate the need to polish the surface 4a of the filter block. The collimating functions would then be performed by optical elements located somewhere else in the optical pathway. Conversely, although the output coupler 5 is shown and described as not performing a lens function, it could have optical elements for performing a lens function, such as a collimating optical element or a focusing optical element for collimating or focusing the light beam of wavelengths WL1-WL4 passing out of the filter block 4. In the latter case, the bonding of the optical block 5 to the filter block 4 by RI-matching epoxy would still obviate the need to polish surface 4b of filter block 4, but the optical block 5 would perform the collimation or focusing function in addition to the output coupling function.

It should be noted that the invention has been described with respect to illustrative embodiments for the purpose of describing the principles and concepts of the invention. The invention is not limited to these embodiments. For example, while the invention has been described with reference to an N-to-1 MUX and a 1-to-N DeMUX, these same principles and concepts may be applied to produce an N-to-M MUX and an M-to-N DeMUX, where N and M are positive integers and N is greater than M. With respect to the process described above with reference to FIG. 4, some of the stated process steps are optional and additional process steps not shown in FIG. 4 may be included. As will be understood by those skilled in the art in view of the description being provided herein, these and many other modifications may be made to the illustrative embodiments described above to achieve the goals of the invention, and all such modifications are within the scope of the invention.

What is claimed is:

1. An optical multiplexer (MUX) comprising:
   a base having at least an upper surface and a lower surface;
   N light sources mounted on the upper surface of the base, where N is an integer that is greater than or equal to two, each light source emitting a light beam of a particular operating wavelength (WL), and wherein the operating WLs are different from one another;
   a lens mounted on the upper surface of the base, the lens collimating each of a respective one of the light beams received from the N light sources into N respective collimated light beams; and
   a filter block mounted on the upper surface of the base, the filter block arranged to receive the N collimated light beams from the lens along N parallel input optical pathways and to redirect each of the N collimated light beams along a main optical pathway that extends from a first end of the filter block to an opposing end of the filter block and is oriented orthogonal to the N parallel input optical pathways, the filter block including at least a first high pass filter and a second high pass filter, each of which is disposed in the main optical pathway, the first high pass filter arranged to pass a first wavelength of light in at least one of the redirected N collimated light beams while blocking a second wavelength of light in the at least one of the redirected N collimated light beams, the second high pass filter arranged to pass each of the first wavelength of light and the second wavelength of light in the at least one of the redirected N collimated light beams while blocking a third wavelength of light in the at least one of the redirected N collimated light beams.

2. The optical MUX of claim 1, wherein the filter block further comprises:
a first reflector disposed in a first filter sub-block for redirecting along the main optical pathway, at least a portion of a first collimated light beam among the N collimated light beams, the first collimated beam of light having the first wavelength; and
a second reflector disposed in a second filter sub-block for redirecting along the main optical pathway at least a portion of a second light beam among the N collimated light beams, the second collimated beam of light having the second wavelength.

3. The optical MUX of claim 1, wherein N is greater than or equal to four such that the optical MUX comprises at least four light sources, $LS_1$-$LS_4$, that produce four light beams, $LB_1$-$LB_4$, and four input optical pathways, $IOP_1$-$IOP_4$ of the filter block for receiving four collimated light beams, $CLB_1$-$CLB_4$, respectively, from the lens.

4. The optical MUX of claim 1, wherein the lens has a first side that acts as an exit facet of the lens and a second side that acts as an entrance facet of the lens, and wherein N divergent light beams produced by the N light sources enter the lens via the entrance facet and the N collimated light beams exit the lens via the exit facet, the exit facet of the lens being adjacent a first side of the filter block through which the N collimated light beams enter the filter block and travel along the N parallel input optical pathways, and wherein a refractive index (RI)-matching epoxy is disposed in between the first side of the lens and the first side of the filter block.

5. The optical MUX of claim 4, wherein at least one of the first side or the second side of the lens is coated with an anti-reflection (AR) coating.

6. The optical MUX of claim 1, wherein the lens and the filter block are made of a same material.

7. The optical MUX of claim 6, wherein the lens and the filter block are made of silicon.

8. The optical MUX of claim 6, wherein the lens and the filter block are made of glass.

9. The optical MUX of claim 6, wherein the lens and the filter block are made of fused silica.

10. The optical MUX of claim 1, further comprising:
an output coupler having a first side and a second side, the first side of the output coupler being in contact with a second side of the filter block, wherein a refractive index (RI)-matching epoxy is disposed in between the first side of the output coupler and the second side of the filter block, the output coupler having an input optical port and an output optical port, the input optical port being optically aligned with an output optical pathway of the filter block, the input optical port of the output coupler being interconnected with the output optical port of the output coupler by at least one optical pathway of the output coupler and wherein at least a portion of all of the collimated light beams of all of the WLs that are received in the output coupler via the input optical port of the output coupler are outputted from the output coupler via the output optical port of the output coupler.

11. The optical MUX of claim 10, wherein at least one of the first side or the second side of the output coupler is coated with an anti-reflection (AR) coating.

12. The optical MUX of claim 10, wherein the output coupler and the filter block are made of a same material.

13. The optical MUX of claim 12, wherein the output coupler and the filter block are made of silicon.

14. The optical MUX of claim 12, wherein the output coupler and the filter block are made of glass.

15. The optical MUX of claim 12, wherein the output coupler and the filter block are made of fused silica.

16. The optical MUX of claim 1, wherein the base is a silicon bench, and wherein the silicon bench includes a device holder that extends above the upper surface of the base, and wherein the N light sources are positioned at precise locations on the device holder such that respective optical axes of the N light sources are aligned with respective collimating optical elements formed in the lens.

17. The optical multiplexer of claim 1, wherein the first wavelength of light is shorter than the second wavelength of light, and the second wavelength of light is shorter than the third wavelength of light.

18. An optical demultiplexer (DeMUX) comprising:
a base having at least an upper surface and a lower surface;
N light detectors mounted on the upper surface of the base, where N is an integer that is greater than or equal to two, each light detector configured to detect a light beam of a particular operating wavelength (WL), and wherein the operating WLs are different from one another; and
a filter block mounted on the upper surface of the base, the filter block arranged to receive a wavelength multiplexed light beam through an input optical port of the filter block and to couple the wavelength multiplexed light beam onto a main optical pathway (OP) that extends between a first end and a second end of the filter block, the main OP orthogonally intersecting N output optical pathways of the filter block, wherein each of the N output optical pathways is oriented towards a respective one of the N light detectors, the filter block including at least a first high pass filter and a second high pass filter, each of which is disposed in the main optical pathway, the first high pass filter configured to pass a first wavelength of light in the wavelength multiplexed light beam while blocking a second wavelength of light in the wavelength multiplexed light beam, the second high pass filter configured to pass each of the first wavelength of light and the second wavelength of light in the wavelength multiplexed light beam while blocking a third wavelength of light in the wavelength multiplexed light beam.

19. The optical DeMUX of claim 18, wherein the filter block further comprises:
a first reflector disposed in a first filter sub-block for redirecting towards a first output optical pathway of the N output optical pathways, a first portion of the wavelength multiplexed light beam corresponding to the first wavelength; and
a second reflector disposed in a second filter sub-block for redirecting towards a second output optical pathway of the N output optical pathways, a second portion of the wavelength multiplexed light beam, the second portion corresponding to the second wavelength.

20. The optical DeMUX of claim 18, wherein N is greater than or equal to four such that the optical DeMUX comprises at least four light detectors, $LD_1$-$LD_4$, configured to detect four light beams, $LB_1$-$LB_4$, of four different WLs, $WL_1$-$WL_4$.

21. The optical DeMUX of claim 18, wherein the N output optical pathways are parallel to one another.

22. The optical DeMUX of claim 19, further comprising:
a lens having a first side that acts as an entrance facet and a second side that acts as an exit facet, the entrance facet arranged to receive light beams exiting from the N output optical pathways located on a first side of the filter block and are directed onto the N light detectors, the first side of the lens being adjacent the first side of the filter block, and wherein a refractive index (RI)-matching epoxy is disposed in between the first side of the lens and the first side of the filter block.

23. The optical DeMUX of claim 22, further comprising:
an input coupler having an input optical port arranged to receive the wavelength multiplexed light beam and an output optical port optically aligned with the input optical port of the filter block for propagating to the filter block, the wavelength multiplexed light beam.

24. The optical DeMUX of claim 23, wherein at least one of a first side or a second side of the input coupler is coated with an anti-reflection (AR) coating.

25. The optical DeMUX of claim 18, wherein the base is a silicon bench, and wherein the silicon bench includes a device holder that extends above the upper surface of the base, and wherein the N light detectors are positioned at precise locations on the device holder such that respective optical axes of the N light detectors are aligned with respective focusing optical elements formed in the lens.

26. An optical demultiplexer (DeMUX) comprising:
a base having at least an upper surface and a lower surface;
at least four light detectors, LD1-LD4, mounted on the upper surface of the base, the light detectors LD1-LD4 configured to detect respective light beams of respective operating wavelengths, WL1-WL4, that are different from one another;
a filter block mounted on the upper surface of the base, the filter block arranged to receive a wavelength multiplexed light beam through an input port of the filter block and to couple the wavelength multiplexed light beam onto a main optical pathway (OP) that extends between a first end and a second end of the filter block, the main OP orthogonally intersecting four output optical pathways, $OP_1$-$OP_4$, of the filter block, wherein each of the four output optical pathways is oriented towards a respective one of the four light detectors, the filter block including at least a first high pass filter and a second high pass filter, each of which is disposed in the main OP, the first high pass filter arranged to pass a first wavelength of light in the wavelength multiplexed light beam while blocking a second wavelength of light in the wavelength multiplexed light beam, the second high pass filter arranged to pass each of the first wavelength of light and the second wavelength of light in the wavelength multiplexed light beam while blocking a third wavelength of light in the wavelength multiplexed light beam.

27. An optical multiplexer comprising:
an optical filter block, the optical filter block comprising:
a first filter sub-block having a first side, a second side, and a third side, the first side arranged to receive a first collimated beam of light at a first wavelength, the second side oriented at an angle less than 90 degrees with respect to the first side and arranged to reflect the first collimated beam of light at the first wavelength towards the third side that is oriented at an angle greater than 90 degrees with respect to the first side;
a second filter sub-block having a first side, a second side, and a third side, the first side arranged to receive a second collimated beam of light at a second wavelength that is longer than the first wavelength, the second side oriented at an angle less than 90 degrees with respect to the first side and arranged to reflect the second collimated beam of light at the second wavelength towards the third side that is oriented at an angle greater than 90 degrees with respect to the first side, wherein the second side of the second filter sub-block is located adjacent to the third side of the first filter sub-block;
a first filter coating located between the third side of the first filter sub-block and the second side of the second filter sub-block, the first filter coating configured to operate as a first high pass filter that passes the first collimated beam of light at the first wavelength while blocking light at other wavelengths that are longer than the first wavelength; and
a second filter coating located next to the third side of the second filter sub-block, the second filter coating configured to operate as a second high pass filter that passes the first collimated beam of light at the first wavelength and the second collimated beam of light at the second wavelength while blocking light at other wavelengths that are longer than the second wavelength.

28. The optical multiplexer of claim 27, wherein the optical filter block further comprises:
a third filter sub-block having a first side, a second side, and a third side, the first side arranged to receive a third collimated beam of light at a third wavelength that is longer than the second wavelength, the second side oriented at an angle less than 90 degrees with respect to the first side and arranged to reflect the third collimated beam of light at the third wavelength towards the third side that is oriented at an angle greater than 90 degrees with respect to the first side, wherein the second side of the third filter sub-block is located adjacent to the third side of the second filter sub-block, and wherein the second filter coating is located between the second side of the third filter sub-block and the third side of the second filter sub-block.

29. The optical multiplexer of claim 27, further comprising:
a first light source configured to emit a first divergent beam of light at the first wavelength;
a second light source configured to emit a second divergent beam of light at the second wavelength; and
a first refractive optical element configured to collimate the first divergent beam of light and to direct the first collimated beam of light towards the first filter sub-block; and
a second refractive optical element configured to collimate the second divergent beam of light and to direct the second collimated beam of light towards the second filter sub-block.

* * * * *